United States Patent
Lu et al.

(10) Patent No.: US 10,152,593 B2
(45) Date of Patent: Dec. 11, 2018

(54) METHOD AND DEVICE FOR IDENTIFYING PIRATED DONGLE

(71) Applicant: FEITIAN TECHNOLOGIES CO., LTD., Haidian District, Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 259 days.

(21) Appl. No.: 14/237,619

(22) PCT Filed: May 8, 2013

(86) PCT No.: PCT/CN2013/075317
§ 371 (c)(1),
(2) Date: Feb. 7, 2014

(87) PCT Pub. No.: WO2014/029221
PCT Pub. Date: Feb. 27, 2014

(65) Prior Publication Data
US 2016/0253496 A1  Sep. 1, 2016

(30) Foreign Application Priority Data

Aug. 21, 2012 (CN) .......................... 2012 1 0299632

(51) Int. Cl.
*G06F 21/00* (2013.01)
*G06F 21/55* (2013.01)
(Continued)

(52) U.S. Cl.
CPC ............ *G06F 21/554* (2013.01); *G06F 21/44* (2013.01); *G06F 21/602* (2013.01)

(58) Field of Classification Search
USPC ........................................................ 713/183
See application file for complete search history.

(56) References Cited

U.S. PATENT DOCUMENTS 6,351,538 B1 * 2/2002 Uz ..................... H04N 5/913
   348/E7.056
6,859,535 B1 * 2/2005 Tatebayashi ............ G06F 21/10
   380/201

(Continued)

FOREIGN PATENT DOCUMENTS

CN    101211386 A    7/2008
CN    101916346 A    12/2010
(Continued)

OTHER PUBLICATIONS

International Search Report and Written Opinion (both in Chinese only) for PCT/CN2013/075317, dated Aug. 15, 2013; ISA/CN.

*Primary Examiner* — Lynn D Feild
*Assistant Examiner* — Vadim Savenkov
(74) *Attorney, Agent, or Firm* — Harness, Dickey & Pierce, P.L.C.

(57) ABSTRACT

A method and a device for identifying pirated dongle are provided. The method includes: determining by an identification device whether any dongle is connected to host; obtaining preset data from a detection list having data volume larger than storage capacity of the dongle; obtaining first input data and first output data; sending the first input data to the dongle; receiving fifth output data; judging whether the fifth output data is identical to the first output data; determining the dongle as legitimate if judgment result is positive; determining the dongle as pirated if judgment result is negative. The detection list has data volume larger than storage capacity of the dongle; during identification, the legitimate dongle returns correct output data based on a cryptographic algorithm, while the pirated dongle without the correct cryptographic algorithm returns wrong data; therefore, the identification device may identify pirated dongle, and protection for dongle is improved.

19 Claims, 4 Drawing Sheets

(51) Int. Cl.
*G06F 21/44* (2013.01)
*G06F 21/60* (2013.01)

(56) References Cited

U.S. PATENT DOCUMENTS

| | | | |
|---|---|---|---|
| 7,819,322 B2 * | 10/2010 | Hammad | G06Q 20/085 235/380 |
| 2002/0138761 A1 * | 9/2002 | Kanemaki | G06F 21/33 726/7 |
| 2003/0046560 A1 * | 3/2003 | Inomata | G06F 21/606 713/189 |
| 2003/0115151 A1 * | 6/2003 | Wheeler | G06Q 20/00 705/64 |
| 2003/0204743 A1 * | 10/2003 | Devadas | G06F 21/31 726/9 |
| 2003/0233573 A1 | 12/2003 | Phinney | |
| 2005/0055318 A1 * | 3/2005 | Ziegler | G06Q 20/347 705/72 |
| 2005/0138386 A1 * | 6/2005 | Le Saint | G06Q 20/38215 713/185 |
| 2005/0188224 A1 * | 8/2005 | Betts-LaCroix | G06F 21/34 726/5 |
| 2006/0098993 A1 * | 5/2006 | Yang | G03G 15/0855 399/12 |
| 2006/0277078 A1 * | 12/2006 | Ohmori | G06Q 10/02 705/5 |
| 2007/0124413 A1 * | 5/2007 | Diab | H04L 9/3236 709/217 |
| 2007/0172064 A1 * | 7/2007 | Nonaka | G06F 21/34 380/258 |
| 2009/0049521 A1 * | 2/2009 | Le Rouzic | G06Q 20/02 726/4 |
| 2009/0187766 A1 * | 7/2009 | Vuillaume | G06F 21/33 713/176 |
| 2009/0307491 A1 * | 12/2009 | Nakatsugawa | G06Q 20/341 713/169 |
| 2010/0250936 A1 * | 9/2010 | Kusakawa | H04L 9/3278 713/169 |
| 2011/0154043 A1 * | 6/2011 | Lim | G06F 21/73 713/172 |
| 2012/0042169 A1 | 2/2012 | Li et al. | |
| 2012/0084565 A1 * | 4/2012 | Wittenberg | H04L 9/3213 713/172 |
| 2012/0134686 A1 * | 5/2012 | Jones | G03G 21/1892 399/12 |
| 2013/0039486 A1 * | 2/2013 | Itoh | H04L 9/3066 380/28 |
| 2013/0114815 A1 * | 5/2013 | Nishimaki | H04L 9/0836 380/278 |

FOREIGN PATENT DOCUMENTS

| | | |
|---|---|---|
| CN | 102468958 A | 5/2012 |
| CN | 102855422 A | 1/2013 |

\* cited by examiner

METHOD AND DEVICE FOR IDENTIFYING PIRATED DONGLE

CROSS-REFERENCE TO RELATED APPLICATIONS

This application is a 371 U.S. National Stage of International Application No. PCT/CN2013/075317 filed on May 8, 2013, which claims priority to Chinese Patent Application No. 201210299632.3, filed on Aug. 21, 2012. The contents of the above applications are incorporated herein by reference in their entirety.

TECHNICAL FIELD

The invention relates to the field of dongle, more particularly to a method and a device for identifying a pirated dongle.

BACKGROUND

A dongle is an encryption product of combination of hardware and software, which is inserted on a computer. As a tool with function of protecting software, the dongle may prevent, by protecting the software and data, the software from being illegitimately used. A software developer may perform data exchange through an interface function and the dongle, i.e., may perform writing or reading on the dongle. With an inbuilt single chip microprocessor circuit, the dongle has determination and analytical ability, and active anti-decryption ability of the dongle is accordingly enhanced. However, due to incorrect use of the dongle by a developer, a cracker may simulate the dongle with a pirated dongle by means of tracking and modulating. The cracker may run encrypted software by using the pirated dongle, which brings security vulnerability to user data.

SUMMARY

To improve the protection for a dongle, a method and a device for identifying a pirated dongle are provided in the invention.

A method for identifying a pirated dongle is provided in the invention. The method includes steps S1-S6.

In the step S1, an identification device determines whether there is any dongle connected to a host; if there is a dongle connected to the host, the procedure proceeds to step S2; if no dongle is connected to the host, information that no dongle is connected to the host is outputted.

In the step S2, the identification device obtains preset data from a detection list based on a preset rule; the preset rule is generated by an encryption device and the preset rule is prestored in the identification device; data volume of the detection list is larger than a storage capacity of the dongle.

In the step S3, the identification device obtains first input data and first output data based on the preset data.

In the step S4, the identification device sends the first input data to the dongle.

In the step S5, the identification device receives fifth output data sent by the dongle.

In the step S6, the identification device determines whether the fifth output data is identical to the first output data; if the fifth output data is identical to the first output data, information that the dongle is legitimate is outputted; if the fifth output data is not identical to the first output data, information that the dongle is pirated is outputted.

The step S6 includes steps S6-1 to S6-4.

In the step S6-1, the identification device determines whether the fifth output data is identical to the first output data; if the fifth output data is identical to the first output data, the procedures proceeds to the step S6-2; if the fifth output data is not identical to the first output data otherwise, the procedures proceeds to the step S6-3.

In the step S6-2, the identification device computes a current count of detection and determines whether the current count of detection reaches a preset count; if the current count of detection reaches the preset count, the procedures proceeds to the step S6-4; if the current count of detection does not reach the preset count, the procedures proceeds to the step S2.

In the step S6-3, the identification device returns information that the identification device is pirated and the procedure is ended.

In the step S6-4, the identification device restores the current count of detection to an initial value and the identification device returns information that the dongle is legitimate.

In the case that the identification device receives a plurality of pieces of fifth output data in the step S5, the step S6 may include steps S6-1' to S6-2'.

In the step S6-1', the identification device computes a current count of detection and determines whether the current count of detection reaches a preset count; if the current count of detection reaches the preset count, the procedure proceeds to the go step S6-2'; if the current count of detection does not reach the preset count, the procedures proceeds to the step S2.

In the step S6-2', the identification device determines whether all pieces of received fifth output data are respectively identical to corresponding pieces of first output data; if all the pieces of received fifth output data are respectively identical to the corresponding pieces of first output data, the procedure proceeds to the step S6-4; if at least one piece of fifth output data is not identical to the corresponding piece of first output data, the procedure proceeds to the step S6-3.

The step S3 may include step S3'.

In the step S3', the identification device decrypts the preset data to obtain the first input data and the first output data.

The step S3 and the step S6 are replaced by step S3" and step S6".

In the step S3", the identification device obtains the first input data and the second output data based on the preset data.

In the step S6", the identification device performs computation on the fifth output data based on a preset conversion algorithm to obtain sixth output data, and the identification device determines whether the sixth output data is identical to the second output data; if the sixth output data is identical to the second output data, information that the dongle is legitimate is outputted; if the sixth output data is not identical to the second output data, information that the dongle is pirated is outputted.

The step S6" includes steps S6"-1 to S6"-4.

In the step S6"-1, the identification device performs computation on the fifth output data based on the preset conversion algorithm to obtain the sixth output data; the identification device determines whether the sixth output data is identical to the second output data; if the sixth output data is identical to the second output data, the procedure proceeds to the step S6"-2; if the sixth output data is not identical to the second output data, the procedure proceeds to the step S6"-3.

In the step S6"-2, the identification device computes a current count of detection and determines whether the current count of detection reaches a preset count; if the current count of detection reaches the preset count, the procedure proceeds to the step S6"-4; if the current count of detection does not reach the preset count, the procedure proceeds to the step S2.

In the step S6"-3, the identification device returns information that the dongle is pirated.

In the step S6"-4, the identification device restores the current count of detection to an initial value and the identification device returns information that the dongle is legitimate.

In the case that the identification device receives a plurality of pieces of fifth output data in the step S5, the Step S6" may include steps S6"-1' to S6"-2'.

In the step S6"-1', the identification device computes the current count of detection and the identification device determines whether the current count of detection reaches the preset count; if the current count of detection reaches the preset count, the procedure proceeds to the step S6"-2'; if the current count of detection does not reach the preset count, the procedure proceeds to the step S2.

In the step S6"-2', the identification device determines whether all pieces of received sixth output data are respectively identical to corresponding pieces of second output data; if all the pieces of received sixth output data are respectively identical to the corresponding pieces of second output data, the procedure proceeds to the step S6"-4; if at least one piece of sixth output data is not identical to the corresponding piece of second output data, the procedure proceeds to the step S6"-3.

The step S3" may include step S3'".

In the step S3'", the identification device decrypts the preset data to obtain the first input data and the second output data.

The step S1 includes steps S11-S15.

In the step S11, after the identification device receives a command of dongle invoking, the identification device determines whether there is any dongle connected to the host; if there is a dongle connected to the host, the procedure proceeds to the step S12; if no dongle is connected to the host, the identification device outputs information that no dongle is connected to the host.

In the step S12, the identification device obtains a first identifier and a second identifier from the dongle.

In the step S13, the identification device determines whether the first identifier and the second identifier are respectively identical to a first identifier prestored in the identification device and a second identifier prestored in the identification device; if the first identifier and the second identifier are respectively identical to the first identifier prestored in the identification device and the second identifier prestored in the identification device, the procedure proceeds to the step S14; if the first identifier and the second identifier are not respectively identical to the first identifier prestored in the identification device and the second identifier prestored in the identification device, the identification device outputs information that the dongle is wrong.

In the step S14, the identification device reading the user identity from the dongle;

In the step S15, the identification device determines whether the user identity is identical to a user identity prestored in the identification device; if the user identity is identical to the user identity prestored in the identification device, the procedure proceeds to the step S2; if the user identity is not identical to the user identity prestored in the identification device, the identification device outputs the information that the dongle is wrong.

Data in the detection list is generated by: performing computation on the first input data by the encryption device based on an algorithm corresponding to the legitimate dongle to obtain the first output data, and performing computation on the first output data based on a preset conversion algorithm to obtain the second output data.

The preset rule in the step S2 includes randomly obtaining the preset data or orderly obtaining the preset data.

After the step S1 and before the step S4, the method further includes: determining, by the identification device, whether the dongle is legitimate; if the dongle is legitimate, the procedure is continued; if the dongle is not legitimate, an error is reported.

Determining whether the dongle is legitimate by the identification device includes: obtaining, by the identification device, a user password from the dongle and determining, by the identification device, whether the user password is identical to a user password stored in the identification device, if the user password is identical to the user password stored in the identification device, the dongle is legitimate; if the user password is not identical to a user password stored in the identification device, the dongle is not legitimate.

The algorithm corresponding to the legitimate dongle includes a cryptographic algorithm and an algorithm with which unique output data may be obtained.

A device for identifying a pirated dongle is provided in the invention. The device includes a first determination module, a storage module, an obtaining module, a sending module, a receiving module, a second determination module and an output module.

The first determination module configured to determine whether there is any qualified dongle connected to a host.

The storage module configured to store a detection list generated by an encryption device; where data volume of the detection list is larger than a storage capacity of the dongle.

The obtaining module is configured to obtain preset data from the detection list and obtain first input data and first output data based on the preset data.

The sending module is configured to send the first input data to the dongle.

The receiving module is configured to receive fifth output data sent by the dongle; where the dongle performs computation on the first input data to obtain the fifth output data.

The second determination module is configured to determine whether the fifth output data is identical to the first output data.

The output module is configured to output information that the dongle is wrong, information that no dongle is connected to the host, information that the dongle is legitimate and information that the dongle is pirated.

The first determination module includes a first determination unit, a first obtaining unit, a second determination unit, a second obtaining unit and a third determination unit.

The first determination unit is configured to determine whether there is any dongle connected to the host.

The first obtaining unit is configured to obtain a first identifier and a second identifier from the dongle.

The second determination unit is configured to determine whether the first identifier and the second identifier are respectively identical to a first identifier prestored in the identification device and a second identifier prestored in the identification device.

The second obtaining unit is configured to obtain a user identity from the dongle.

The third determining unit configured to determine whether the user identity is identical to a user identity prestored in the identification device.

The identification device further includes a verification module, a decryption module and a computation module.

The verification module is configured to verify whether the dongle is legitimate.

The decryption module is configured to decrypt the preset data to obtain the first input data and the first output data, or to decrypt the preset data to obtain the first input data and the second output data.

The computation module is configured to compute the fifth output data based on a preset algorithm to obtain sixth output data.

The second determination module is further configured to determine whether the sixth output data is identical to the second output data.

The verification module includes a third obtaining unit and a fourth determination unit.

The third obtaining unit is configured to obtain a user password from the dongle.

The fourth determining unit is configured to determine whether the user password is identical to a user password stored in the identification device.

The second determination module includes a first comparison unit, a first computation unit and a second comparison unit.

The first comparison unit is configured to determine whether the fifth output data is identical to the first output data, or to determine whether the sixth output data is identical to the second output data.

The first computation unit is configured to compute a current count of detection.

The second comparison unit is configured to determine whether the current count of detection reaches a preset count.

The output module includes a second computation unit and a first output unit.

The second computation unit is configured to restore the current count of detection to an initial value.

The first output unit is configured to output information that the dongle is wrong, information that no dongle is connected to the host, information that the dongle is legitimate or information that the dongle is pirated.

The first comparison unit is further configured to determine whether all pieces of received fifth output data are respectively identical to corresponding pieces of first output data, or determine whether all pieces of received sixth output data are respectively identical to corresponding pieces of second output data.

Compared with the prior art, the present invention has the following advantages.

The identification device is prestored with the detection list and the data volume of the detection list is larger than the volume of the storage of the dongle; in an identification process, the legitimate dongle may return correct output data to the identification device based on the cryptographic algorithm of the legitimate dongle, while the pirated dongle without the correct cryptographic algorithm may return wrong data to the identification device; therefore, the identification device may identify the pirated dongle, and the protection for the dongle is improved.

BRIEF DESCRIPTION OF THE ACCOMPANYING DRAWINGS

DETAILED DESCRIPTION OF THE EMBODIMENTS

In order to further describe technical means and effects of the present invention, a method and a device for identifying a pirated dongle in the invention are described in conjunction with drawings and preferred embodiments. The detailed embodiments are described as follows.

A First Embodiment

Figure 1:
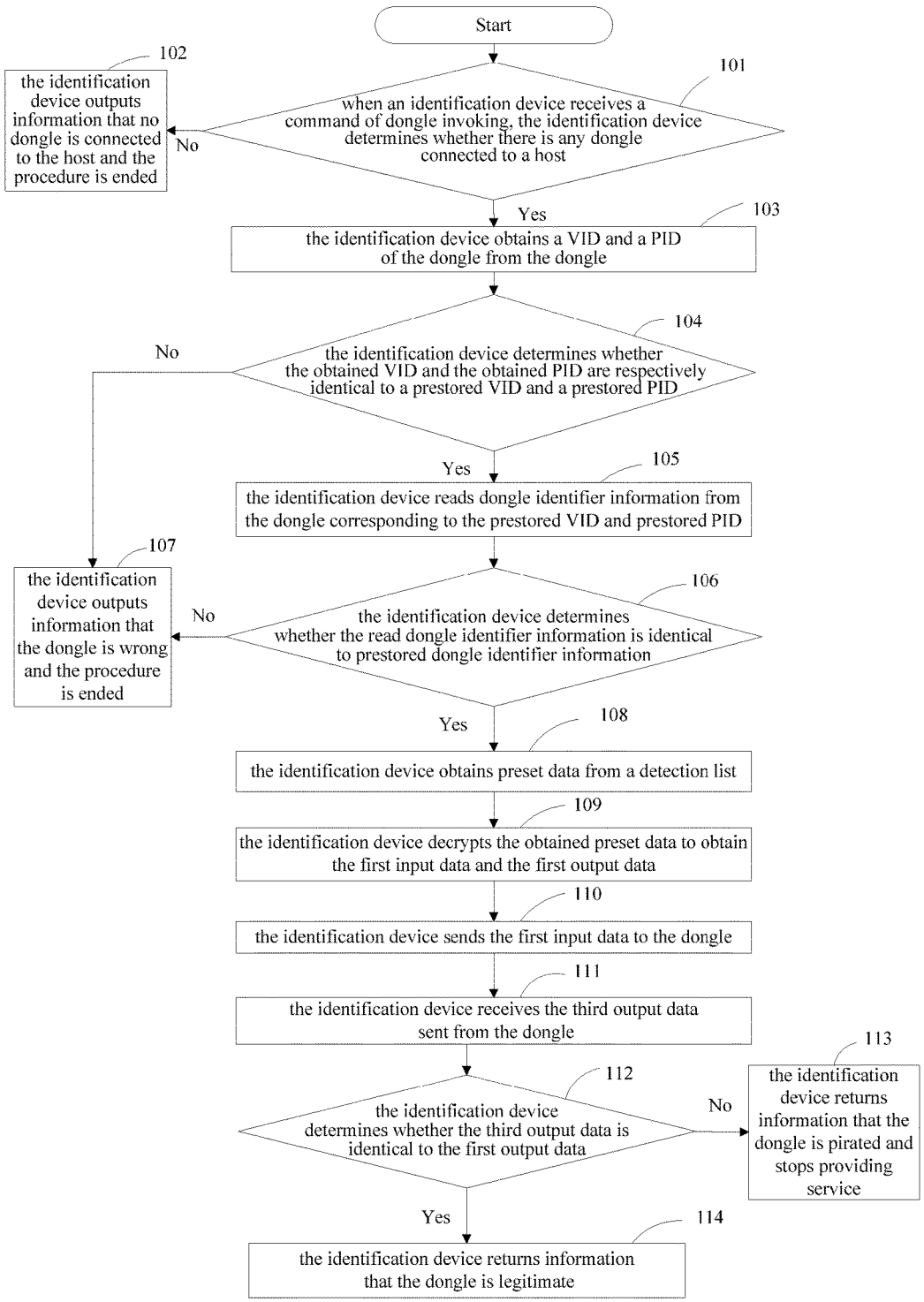
FIG. 1 is a flow chart of a method for identifying a pirated dongle according to a first embodiment of the present invention.

A method for identifying a pirated dongle is provided according to the first embodiment of the present invention. An identification device according to the first embodiment is set in a host, the identification device communicates with a dongle via the host. As shown in FIG. 1, the method includes steps 101-114.

In the step 101, when the identification device receives a command of dongle invoking, the identification device determines whether there is any dongle connected to the host; if there is a dongle connected to the host, the procedure proceeds to the step 103; if no dongle is connected to the host, the procedure proceeds to the step 102.

In the step 102, the identification device outputs information that no dongle is connected to the host and the procedure is ended.

In the step 103, the identification device orderly obtains, from the dongle, a VID (vendor identity) and a PID (product identity) of the dongle.

In the step 104, the identification device determines whether the obtained VID and the obtained PID are respectively identical to prestored VID and prestored PID; if the obtained VID and the obtained PID are respectively identical to the prestored VID and the prestored PID, the procedure proceeds to the step 105; if the obtained VID and the obtained PID are not respectively identical to the prestored VID and the prestored PID, the procedure proceeds to the step 107.

In the step 105, the identification device reads dongle identifier information from the dongle corresponding to the prestored VID and prestored PID.

According to the embodiment, the dongle identifier information includes a UID (user identity) or a user identifier.

In the step 106, the identification device determines whether the read dongle identifier information is identical to prestored dongle identifier information; if the read dongle identifier information is identical to the prestored identifier information, the procedure proceeds to the step 108; if the read dongle identifier information is not identical to the prestored identifier information, the procedure proceeds to the step 107.

In the step 107, the identification device outputs information that the dongle is wrong and the procedure is ended.

In the step 108, the identification device obtains preset data from a detection list.

Preferably, according to the embodiment, the identification device randomly obtains the preset data from the detection list.

According to the embodiment, the detection list is generated by an encryption device in advance and the detection list is stored in the identification device. Data volume of the detection list is larger than a storage capacity of the dongle; preferably, according to the embodiment, the data volume of the detection list is 100 times of the volume of the storage of the dongle. The detection list is stored with encrypted data including second input data and second output data. A method for generating the second input data and the second output data includes: performing computation on first input data by the encryption device based on a first algorithm to obtain first output data, and encrypting the first input data and the first output data by the encryption device based on a second algorithm to obtain the second input data and the second output data; then, the second input data and the second output data are correspondingly stored in the detection list.

According to the embodiment, the first algorithm is an algorithm of a legitimate dongle.

Preferably, according to the embodiment, the first algorithm is the algorithm of the legitimate dongle corresponding to user identifier information.

According to the embodiment, the second algorithm includes a symmetric key cryptographic algorithm and an asymmetric key cryptographic algorithm; the second algorithm includes DES, 3DES, AES, RSA and ECC, etc.; preferably, according to the embodiment, 3DES algorithm is used to encrypt the data in the detection list.

According to the embodiment, the first input data includes:
1234567890ABCDEF1234567890ABCDEF,
12345678123456781234567812345678,
112233445566778899000AABBCCDDEEFF, and
FEDCBA0987654321FEDCBA0987654321;

the algorithm of the legitimate dongle is DES, i.e., DES algorithm is used to perform computation on the first input data with a key of 1122334455667788 so as to obtain the first output data; the first input data and the first output data are shown in the following table:

| First input data | First output data |
| --- | --- |
| 1234567890ABCDEF1234567890ABCDEF | 80B152BBAB64EAFF80B152BBAB64EAFF |
| 12345678123456781234567812345678 | DD1681F0D761A242DD1681F0D761A242 |
| 112233445566778899000AABBCCDDEEFF | CD09BC4876AC0F2BB7163C1897EF4700 |
| FEDCBA0987654321FEDCBA0987654321 | 6DB4D45451E4FFD16DB4D45451E4FFD1 |

3DES algorithm is used to encrypt the first input data and the first output data with a key of 112233445566778899000AABBCCDDEEFF so as to obtain the second input data and the second output data; then the second input data and the second output data are correspondingly stored in the detection list. The second input data and the second output data are as shown in the following table:

| Second input data | Second output data |
| --- | --- |
| 1B3606F30B1015071B3606F30B101507 | 974622F00725BCC3974622F00725BCC3 |
| 1C04C8D866790D061C04C8D866790D06 | 7540BFAC29E207CE7540BFAC29E207CE |
| ED0AC87C52A8A551C7C29D70B3716684 | 3DA0E025243DA3F5F99FD4126437CA4E |
| 4462E4C96A4FF4C54462E4C96A4FF4C5 | E2E72852C025A3BFE2E72852C025A3BF |

In the step 109, the identification device decrypts the obtained preset data to obtain the first input data and the first output data.

According to the embodiment, the preset data obtained by the identification device includes the second input data 1B3606F30B1015071B3606F30B101507 and the second output data 974622F00725BCC3974622F00725BCC3; the identification device decrypts the above group of data, and the first input data 1234567890ABCDEF1234567890ABCDEF and the first output data 80B152BBAB64EAFF80B152BBAB64EAFF are accordingly obtained.

In the step 110, the identification device sends the first input data to the dongle.

According to the embodiment, the identification device sends the first input data 1234567890ABCDEF1234567890ABCDEF to the dongle.

According to the embodiment, when the dongle receives the first input data sent by the identification device, the dongle performs computation on the first input data based on an inbuilt algorithm, third output data is accordingly generated; and the dongle returns the third output data to the identification device.

According to the embodiment, the dongle performs computation on the first input data 1234567890ABCDEF1234567890ABCDEF by using DES algorithm with the key of 1122334455667788, the third output data 80B152BBAB64EAFF80B152BBAB64EAFF is accordingly generated; and the dongle returns the third output data to the identification device.

According to the embodiment, before the step 110, the method further includes: verifying, by the identification device, whether the dongle is legitimate; if the dongle is legitimate, the procedure is continued; if the dongle is not legitimate, an error is reported and the procedure is ended.

The process of verifying whether the dongle is legitimate includes: obtaining, the identification device, a PIN from the dongle by and determining whether the obtained PIN is identical to a PIN in the identification device; if the obtained PIN is identical to a PIN in the identification device, the dongle is legitimate; if the obtained PIN is not identical to a PIN in the identification device, the dongle is not legitimate. According to the embodiment, the PIN in the identification device is input by a user or prestored.

In the step 111, the identification device receives the third output data sent from the dongle.

The step 111 further includes: proceeding to the step 113 in the case that the dongle does not receive the third output data sent by the dongle in a preset detection time; according to the embodiment, the preset detection time lasts 10 seconds.

According to the embodiment, the third output data received by the identification device in the preset detection time is 80B152BBAB64EAFF80B152BBAB64EAFF.

In the step 112, the identification device determines whether the third output data is identical to the first output data; if the third output data is identical to the first output data, the procedure proceeds to the step 114; if the third output data is not identical to the first output data, the procedure proceeds to the step 113.

According to the embodiment, the third output data is 80B152BBAB64EAFF80B152BBAB64EAFF; the first output data is 80B152BBAB64EAFF80B152BBAB64EAFF.

In the step 113, the identification device returns information that the dongle is pirated and stops providing service.

In the step 114, the identification device returns information that the dongle is legitimate.

Alternatively, according to the embodiment, computation may be performed on the first output data based on the second algorithm to obtain the second output data; therefore, after the identification device receives the third output data in the step 111, computation is performed on the third output data and fourth output data is accordingly obtained; in the step 112, it is determined whether the fourth output data is identical to the second output data, and corresponding information is returned based on the result of determination. Alternatively, according to the embodiment, the detection list may not be encrypted; consequently in the step 108, the identification device obtains the first input data and the first output data from the detection list or the identification device obtains the first input data and the second output data from the detection list, and then the procedure proceeds to the step 110 of sending the first input data to the dongle by the identification device.

A Second Embodiment

Figure 2:
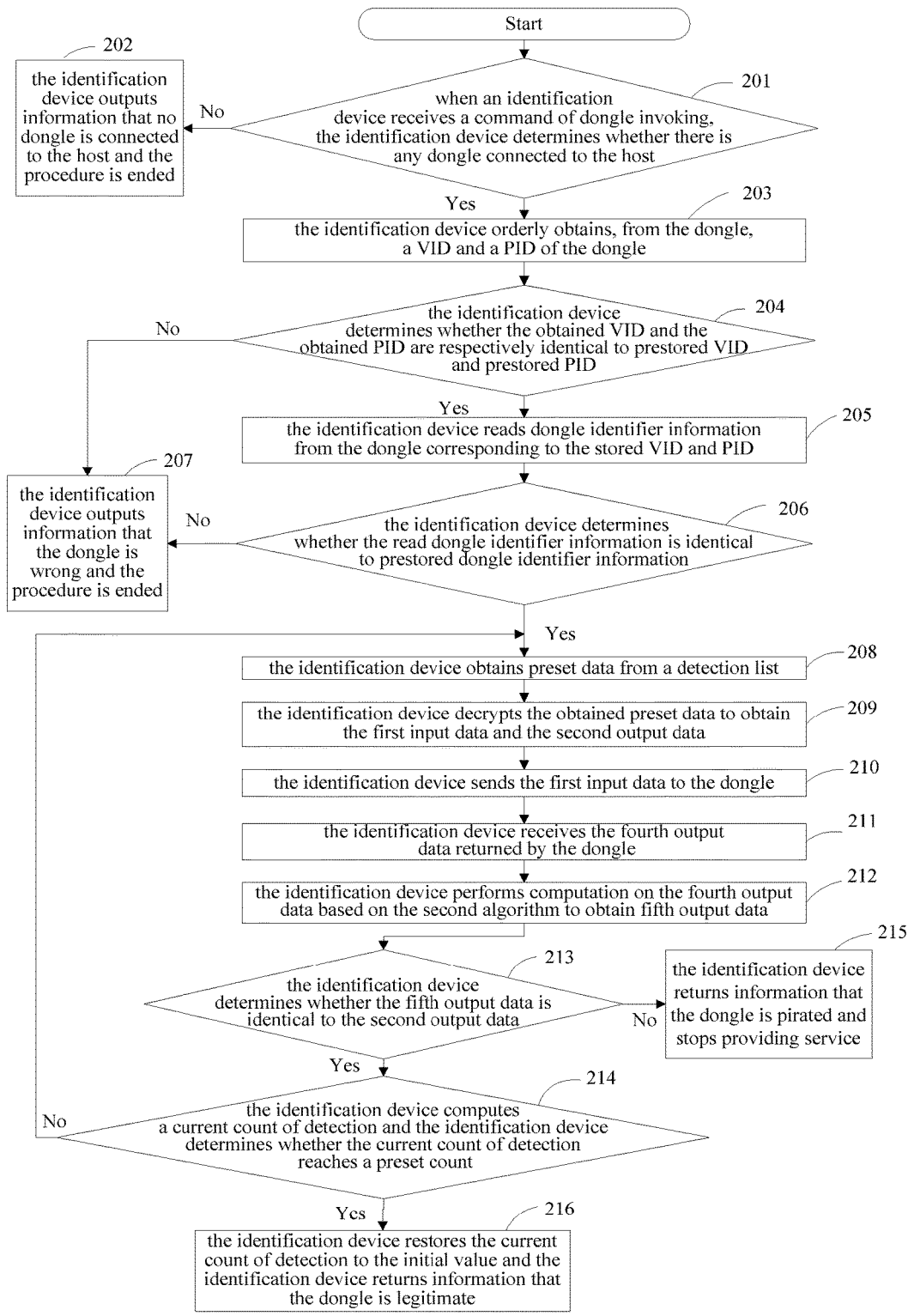
FIG. 2 is a flow chart of a method for identifying a pirated dongle according to a second embodiment of the present invention.

A method for identifying a pirated dongle is provided according to the second embodiment of the invention. An identification device is set in a host and the identification device communicates with a dongle via the host. As shown in FIG. 2, the method includes steps 201-216.

In the step 201, when the identification device receives a command of dongle invoking, the identification device determines whether there is any dongle connected to the host; if there is a dongle connected to the host, the procedure proceeds to the step 203; if no dongle is connected to the host, the procedure proceeds to the step 202.

In the step 202, the identification device outputs information that no dongle is connected to the host and the procedure is ended.

In the step 203, the identification device orderly obtains, from the dongle, a VID (vendor identity) and a PID (product identity) of the dongle.

In the step 204, the identification device determines whether the obtained VID and the obtained PID are respectively identical to a prestored VID and a prestored PID; if the obtained VID and the obtained PID are respectively identical to the prestored VID and the prestored PID, the procedure proceeds to the step 205; if the obtained VID and the obtained PID are not respectively identical to the prestored VID and the prestored PID, the procedure proceeds to the step 207.

In the step 205, the identification device reads dongle identifier information from the dongle corresponding to the stored VID and PID.

According to the embodiment, the dongle identifier information includes a UID (user identity) or a user identifier.

In the step 206, the identification device determines whether the read dongle identifier information is identical to prestored dongle identifier information; if the read dongle identifier information is identical to the prestored identifier information, the procedure proceeds to the step 208; if the read dongle identifier information is not identical to the prestored identifier information, the procedure proceeds to the step 207.

In the step 207, the identification device outputs information that the dongle is wrong and the procedure is ended.

In the step 208, the identification device obtains preset data from a detection list.

Preferably, according to the embodiment, the identification device randomly obtains the preset data from the detection list; alternatively, the identification device may orderly obtain the preset data from the detection list; in a circular detection process, the identification device obtains the data after the preset data obtained in a previous detection.

According to the embodiment, the detection list is generated by an encryption device in advance and the detection list is stored in the identification device. Data volume of the detection list is larger than a storage capacity of the dongle; preferably, according to the embodiment, the data volume of the detection list is 100 times of the volume of the storage of the dongle. The detection list is stored with encrypted data including second input data and third output data. A method for generating the second input data and the third output data includes: performing computation on first input data by the encryption device based on a first algorithm to obtain first output data, performing a one-way conversion on the first output data based on a second algorithm to obtain second output data, and encrypting the first input data and the second output data by the encryption device based on a third algorithm to obtain the second input data and the third output data; then, the second input data and the third output data are correspondingly stored in the detection list.

According to the embodiment, the first algorithm is an algorithm of a legitimate dongle.

Preferably, according to the embodiment, the first algorithm is the algorithm of the legitimate dongle corresponding to user identifier information.

According to the embodiment, the second algorithm is the one-way conversion such as a digest algorithm; preferably, according to the embodiment, the second algorithm is MD5 algorithm.

According to the embodiment, the third algorithm includes a symmetrical key cryptographic algorithm and an asymmetrical key cryptographic algorithm; the third algorithm includes DES, 3DES, AES, RSA and ECC, etc.; preferably, 3DES algorithm is used for encrypting the data in the detection list.

According to the embodiment, the first input data includes:
1234567890ABCDEF1234567890ABCDEF,
12345678123456781234567812345678,
112233445566778899000AABBCCDDEEFF, and
FEDCBA0987654321FEDCBA0987654321;

the algorithm of the legitimate dongle is DES, i.e. DES algorithm is used for performing computation on the first input data with a key of 1122334455667788 so as to obtain the first output data; then MD5 algorithm is used for performing the one-way conversion on the first output data so as to obtain the second output data; the first input data, the first output data and the second output data are shown in the following table:

| First input data | First output data | Second output data |
|---|---|---|
| 1234567890ABCDEF1234567890ABCDEF | 80B152BBAB64EAFF80B152BBAB64EAFF | BB12EDB2087206CC0745D9D16D91E620 |
| 12345678123456781234567812345678 | DD1681F0D761A242DD1681F0D761A242 | 885B8830B2C63C07282602DFAE43C474 |
| 11223344556677889900AABBCCDDEEFF | CD09BC4876AC0F2BB7163C1897EF4700 | DDC1DC706F7F71190401509044A55682 |
| FEDCBA0987654321FEDCBA0987654321 | 6DB4D45451E4FFD16DB4D45451E4FFD1 | 6F7A7CAD36C9D5014ED35D53F3FADF84 |

3DES algorithm is used for encrypting the first input data and the second output data a key of 11223344556677889900AABBCCDDEEFF so as to obtain the second input data and the third output data; then the second input data and the third output data are correspondingly stored in the detection list. The second input data and the third output data are shown in the following table:

| Second input data | Third output data |
|---|---|
| 1B3606F30B1015071B3606F30B101507 | 3F2654F07C0336CD987E16820232DFB7 |
| 1C04C8D866790D061C04C8D866790D06 | 0C2AD91D799FFDD6021BE506DAEAD40B |
| ED0AC87C52A8A551C7C29D70B3716684 | 2E8323C02EFC3E1176ABDC4E7085DE92 |
| 4462E4C96A4FF4C54462E4C96A4FF4C5 | 02F2A36D0C30DE5FFB89372973FF59AF |

In the step 209, the identification device decrypts the obtained preset data to obtain the first input data and the second output data.

According to the embodiment, the preset data obtained by the identification device includes the second input data 1C04C8D866790D061C04C8D866790D06 and the third output data 0C2AD91D799FFDD6021BE506DAEAD40B; the identification device decrypts the group of above data, and the first input data 12345678123456781234567812345678 and the second output data 885B8830B2C63C07282602DFAE43C474 are accordingly obtained.

In the step 210, the identification device sends the first input data to the dongle.

According to the embodiment, the identification device sends the first input data 12345678123456781234567812345678 to the dongle.

According to the embodiment, when the dongle receives the first input data sent by the identification device, the dongle performs computation on the first input data based on an inbuilt algorithm to generate fourth output data; and the dongle returns the fourth output data to the identification device.

According to the embodiment, the dongle uses DES algorithm to perform computation on the first input data 12345678123456781234567812345678 with the key of 1122334455667788, the fourth output data DD1681F0D761A242DD1681F0D761A242 is accordingly generated; and the dongle returns the fourth output data to the identification device.

According to the embodiment, before the step 210, the method further includes: verifying, by the identification device, whether the dongle is legitimate; if the dongle is legitimate, the procedure is continued; if the dongle is not legitimate, an error is reported and the procedure is ended.

The process of verifying whether the dongle is legitimate includes: obtaining, by the identification device, a PIN from the dongle and determining whether the obtained PIN is identical to a PIN in the identification device; if the obtained PIN is identical to a PIN in the identification device, the dongle is legitimate; if the obtained PIN is not identical to a PIN in the identification device, the dongle is not legitimate. According to the embodiment, the PIN in the identification device is input by a user or prestored.

In the step 211, the identification device receives the fourth output data returned by the dongle.

The step 211 further includes: proceeding to the step 215 in the case that the dongle does not receive the fourth output data sent by the dongle in a preset detection time; according to the embodiment, the preset detection time lasts 5 seconds.

According to the embodiment, the fourth output data received by the identification device in the preset detection time is DD1681F0D761A242DD1681F0D761A242.

In the step 212, the identification device performs computation on the fourth output data based on the second algorithm to obtain fifth output data.

According to the embodiment, the identification device performs computation on the fourth output data by using MD5 algorithm, and accordingly, the fifth output data 885B8830B2C63C07282602DFAE43C474 is obtained.

In the step 213, the identification device determines whether the fifth output data is identical to the second output data, if the fifth output data is identical to the second output data, the procedure proceeds to the step 214; if the fifth output data is not identical to the second output data, the procedure proceeds to the step 215.

According to the embodiment, the fifth output data is 885B8830B2C63C07282602DFAE43C474 and the second output data is 885B8830B2C63C07282602DFAE43C474.

In the step 214, the identification device computes a current count of detection and the identification device determines whether the current count of detection reaches a preset count; if the current count of detection reaches the preset count of detection, the procedure proceeds to the step 216; if the current count of detection does not reach the preset count of detection, the procedure proceeds to the step 208.

For example, according to the embodiment, an initial value of the current count of detection is 0 and the preset count is set to be 4; the current count of detection is incremented by 1 each time when the identification device is detected, till the current count of detection reaches 4.

In the step 215, the identification device returns information that the dongle is pirated and stops providing service.

In the step 216, the identification device restores the current count of detection to the initial value and the identification device returns information that the dongle is legitimate.

Alternatively, according to the embodiment, computation may not be performed on the first output data based on the second algorithm; therefore, after the identification device receives the fourth output data in the step 211, it is determined whether the fourth output data is identical to the first output data, and corresponding information is returned based on the result of determination. Alternatively according to the embodiment, the detection list may not be encrypted; consequently in the step 108, the identification device obtains the first input data and the first output data from the detection list or the identification device obtains the first input data and the second output data from the detection list, and then the procedure proceeds to the step 210 of sending the first input data to the dongle by the identification device.

A Third Embodiment

Figure 3:
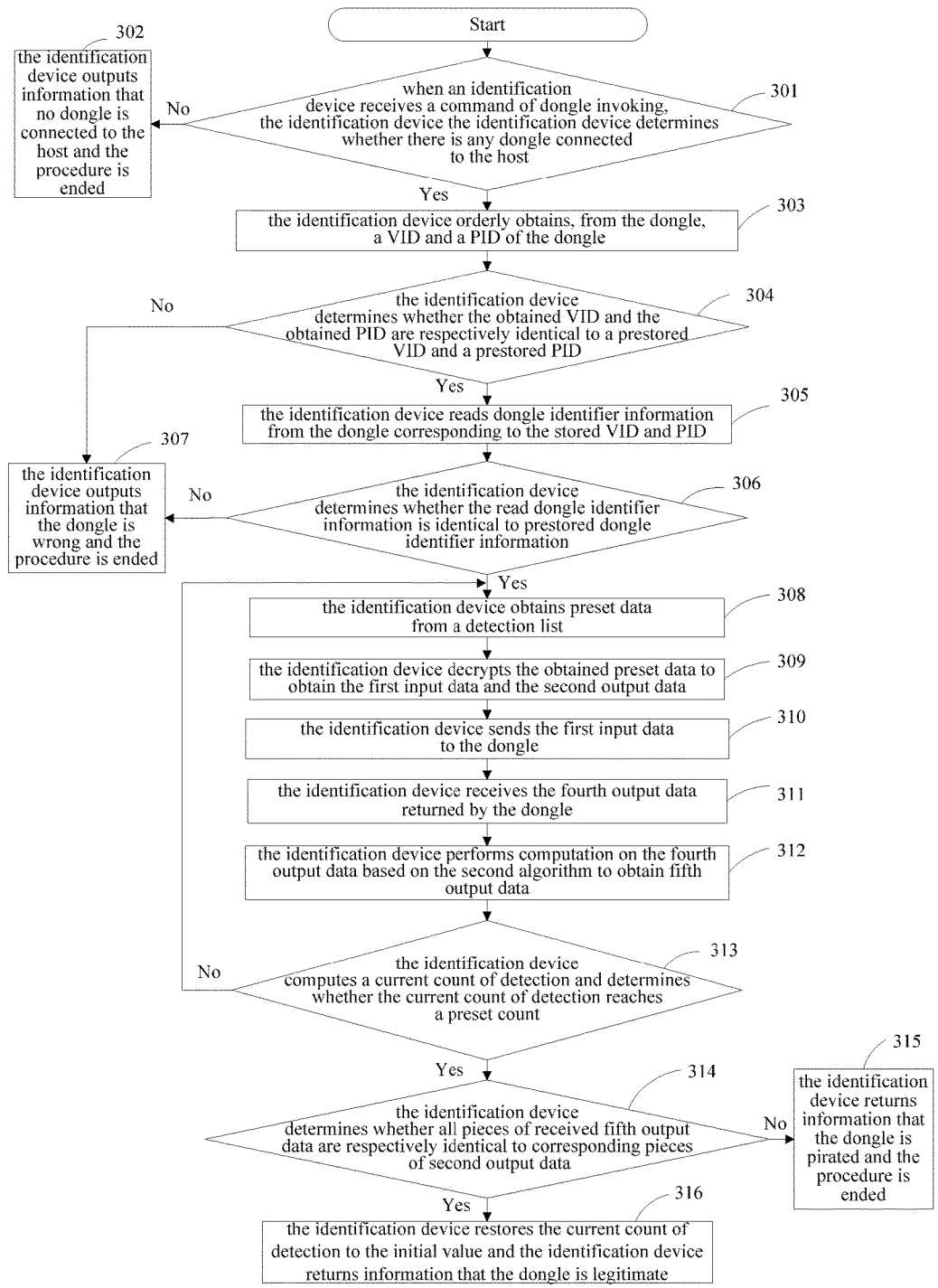
FIG. 3 is a flow chart of a method for identifying a pirated dongle according to a third embodiment of the present invention.

A method for identifying a pirated dongle is provided according to the third embodiment of the invention. An identification device is set in a host and the identification device communicates with a dongle via the host. As shown in FIG. 3, the method includes steps 301-316.

In the step 301, when the identification device receives a command of dongle invoking, the identification device the identification device determines whether there is any dongle connected to the host; if there is a dongle connected to the host, the procedure proceeds to the step 303; if no dongle is connected to the host, the procedure proceeds to the step 302.

In the step 302, the identification device outputs information that no dongle is connected to the host and the procedure is ended.

In the step 203, the identification device orderly obtains, from the dongle, a VID (vendor identity) and a PID (product identity) of the dongle.

In the step 304, the identification device determines whether the obtained VID and the obtained PID are respectively identical to a prestored VID and a prestored PID; if the obtained VID and the obtained PID are respectively identical to the prestored VID and the prestored PID, the procedure proceeds to the step 305; if the obtained VID and the obtained PID are not respectively identical to the prestored VID and the prestored PID, the procedure proceeds to the step 307.

In the step 305, the identification device reads dongle identifier information from the dongle corresponding to the stored VID and PID.

According to the embodiment, the dongle identifier information includes a UID (user identity) or a user identifier.

In the step 306, the identification device determines whether the read dongle identifier information is identical to prestored dongle identifier information; if the read dongle identifier information is identical to the prestored identifier information, the procedure proceeds to the step 308; if the read dongle identifier information is not identical to the prestored identifier information, the procedure proceeds to the step 307.

In the step 307, the identification device outputs information that the dongle is wrong and the procedure is ended.

In the step 308, the identification device obtains preset data from a detection list.

Preferably, according to the embodiment, the identification device randomly obtains the preset data from the detection list; alternatively, the identification device may orderly obtain the preset data from the detection list; in a circular detection process, the identification device obtains the data after the preset data obtained in a previous detection.

According to the embodiment, the detection list is generated by an encryption device in advance and the detection list is stored in the identification device. Data volume of the detection list is larger than a storage capacity of the dongle; preferably, according to the embodiment, the data volume of the detection list is 100 times of the volume of the storage of the dongle. The detection list is stored with encrypted data including second input data and third output data. A method for generating the second input data and the third output data includes: performing computation on first input data by the encryption device based on a first algorithm to obtain first output data, performing a one-way conversion on the first output data based on a second algorithm to obtain second output data, and encrypting the first input data and the second output data by the encryption device based on a third algorithm to obtain the second input data and the third output data; then, the second input data and the third output data are correspondingly stored in the detection list.

According to the embodiment, the first algorithm is an algorithm of a legitimate dongle.

Preferably, according to the embodiment, the first algorithm is the algorithm of the legitimate dongle corresponding to user identifier information.

According to the embodiment, the second algorithm is the one-way conversion such as a digest algorithm; preferably, according to the embodiment, the second algorithm is MD5 algorithm.

According to the embodiment, the third algorithm includes a symmetrical key cryptographic algorithm and an asymmetrical key cryptographic algorithm; the third algorithm includes DES, 3DES, AES, RSA and ECC, etc.; preferably, 3DES algorithm is used for encrypting the data in the detection list.

According to the embodiment, the first input data includes:
1234567890ABCDEF1234567890ABCDEF,
12345678123456781234567812345678,
11223344556677889900AABBCCDDEEFF, and
FEDCBA0987654321FEDCBA0987654321;

the algorithm of the legitimate dongle is DES, i.e. DES algorithm is used to perform computation on the first input data with a key of 1122334455667788 so as to obtain the first output data; then MD5 algorithm is used to perform the one-way conversion on the first output data so as to obtain the second output data; the first input data, the first output data and the second output data are shown in the following table:

| First input data | First output data | Second output data |
|---|---|---|
| 1234567890ABCDEF1234567890ABCDEF | 80B152BBAB64EAFF80B152BBAB64EAFF | BB12EDB2087206CC0745D9D16D91E620 |
| 12345678123456781234567812345678 | DD1681F0D761A242DD1681F0D761A242 | 885B8830B2C63C07282602DFAE43C474 |
| 11223344556677889900AABBCCDDEEFF | CD09BC4876AC0F2BB7163C1897EF4700 | DDC1DC706F7F711904015090 44A55682 |
| FEDCBA0987654321FEDCBA0987654321 | 6DB4D45451E4FFD16DB4D45451E4FFD1 | 6F7A7CAD36C9D5014ED35D53F3FADF84 |

3DES algorithm is used to encrypt the first input data and the second output data with a key of 11223344556677889900AABBCCDDEEFF so as to obtain the second input data and the third output data; then the second input data and the third output data are correspondingly stored in the detection list. The second input data and the third output data are shown in the following table:

| Second input data | Third output data |
|---|---|
| 1B3606F30B1015071B3606F30B101507 | 3F2654F07C0336CD987E16820232DFB7 |
| 1C04C8D866790D061C04C8D866790D06 | 0C2AD91D799FFDD6021BE506DAEAD40B |
| ED0AC87C52A8A551C7C29D70B3716684 | 2E8323C02EFC3E1176ABDC4E7085DE92 |
| 4462E4C96A4FF4C54462E4C96A4FF4C5 | 02F2A36D0C30DE5FFB89372973FF59AF |

In the step 309, the identification device decrypts the obtained preset data to obtain the first input data and the second output data.

According to the embodiment, the preset data obtained by the identification device includes the second input data ED0AC87C52A8A551C7C29D70B3716684 and the third output data 2E8323C02EFC3E1176ABDC4E7085DE92; the identification device decrypts the group of above data, and the first input data 11223344556677889900AABBCCDDEEFF and the second output data DDC1DC706F7F71190401509044A55682 are accordingly obtained.

According to the embodiment, if the identification device orderly obtains the preset data from the detection list, when obtaining the preset data again, the preset data obtained by the identification device includes the second input data 4462E4C96A4FF4C54462E4C96A4FF4C5 and the third output data 02F2A36D0C30DE5FFB89372973FF59AF.

In the step 310, the identification device sends the first input data to the dongle.

According to the embodiment, the identification device sends the first input data 11223344556677889900AABBCCDDEEFF to the dongle.

According to the embodiment, when the dongle receives the first input data sent by the identification device, the dongle performs computation on the first input data based on an inbuilt algorithm to generate fourth output data; and the dongle returns the fourth output data to the identification device.

According to the embodiment, the dongle uses DES algorithm to perform computation on the first input data 11223344556677889900AABBCCDDEEFF with the key of 1122334455667788, the fourth output data CD09BC4876AC0F2BB7163C1897EF4700 is accordingly generated; and the dongle returns the fourth output data to the identification device.

According to the embodiment, before the step 310, the method further includes: verifying, by the identification device, whether the dongle is legitimate; if the dongle is legitimate, the procedure is continued; if the dongle is not legitimate, an error is reported and the procedure is ended. The process of verifying whether the dongle is legitimate includes: obtaining, by the identification device, a PIN from the dongle and determining whether the obtained PIN is identical to a PIN in the identification device; if the obtained PIN is identical to a PIN in the identification device, the dongle is legitimate; if the obtained PIN is not identical to a PIN in the identification device, the dongle is not legitimate. According to the embodiment, the PIN in the identification device is input by a user or prestored.

In the step 311, the identification device receives the fourth output data returned by the dongle.

The step 311 further includes: proceeding to the step 315 in the case that the identification device does not receive the fourth output data sent from the dongle in a preset detection time; continuing the procedure in the case that the identification device receives the fourth output data sent from the dongle in the preset detection time; according to the embodiment, the preset detection time lasts 10 seconds.

According to the embodiment, the fourth output data received by the identification device in the preset detection time is CD09BC4876AC0F2BB7163C1897EF4700.

In the step 312, the identification device performs computation on the fourth output data based on the second algorithm to obtain fifth output data.

According to the embodiment, the identification device performs computation on the fourth output data based on MD5 algorithm, and accordingly, the fifth output data DDC1DC706F7F71190401509044A55682 is obtained.

In the step 313, the identification device computes a current count of detection and determines whether the current count of detection reaches a preset count; if the current count of detection reaches the preset count, the procedure proceeds to the step 314; if the current count of detection does not reach the preset count otherwise, the procedure proceeds to the step 308.

For example, according to the embodiment, an initial value of the current count of detection is 4 and the preset count is set to be 0; 1 is subtracted from the current count of detection each time when the identification device is detected, till the current count of detection becomes 0.

In the step 314, the identification device determines whether all pieces of received fifth output data are respectively identical to corresponding pieces of second output data, if all the pieces of received fifth output data are respectively identical to the corresponding pieces of second output data, the procedure proceeds to the step 316; if at least one piece of fifth output data is not identical to the corresponding piece of second output data, the procedure proceeds to the step 315.

In the step 315, the identification device returns information that the dongle is pirated and the procedure is ended.

In the step 316, the identification device restores the current count of detection to the initial value and the identification device returns information that the dongle is legitimate.

Alternatively, according to the embodiment, computation may not be performed on the first output data based on the second algorithm; therefore, after the identification device receives the fourth output data in the step 311, the procedure proceeds to the step 312; in the step 314, it is determined whether all pieces of received fourth output data are respectively identical to corresponding pieces of first output data, and corresponding information is returned based on the result of determination. Alternatively, according to the embodiment, the detection list may not be encrypted; consequently in the step 108, the identification device obtains the first input data and the first output data from the detection list or the identification device obtains the first input data and the second output data from the detection list, and then the procedure proceeds to the step 310 of sending the first input data to the dongle by the identification device.

A Fourth Embodiment

Figure 4:
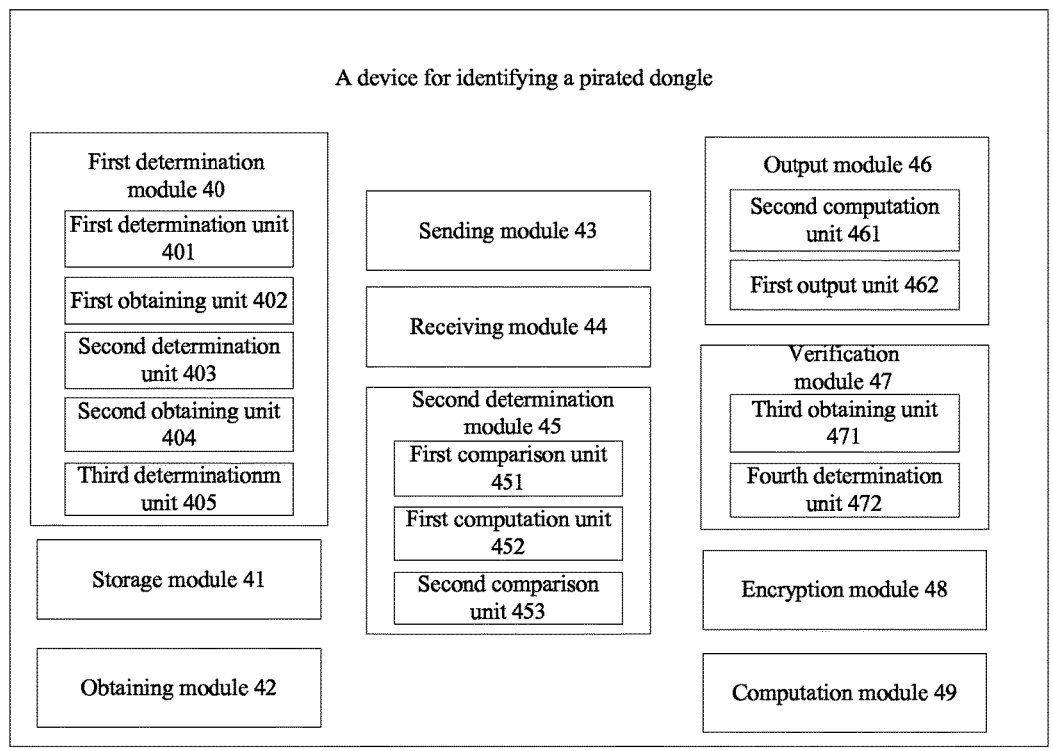
FIG. 4 is a schematic block diagram of a device for identifying a pirated dongle according to a fourth embodiment of the present invention.

A device of identifying a pirated dongle is provided according to the fourth embodiment of the invention. As shown in FIG. 4, the device includes a first determination module 40, a storage module 41, an obtaining module 42, a sending module 43, a receiving module 44, a second determination module 45 and an output module 46.

The first determination module 40 is configured to determine whether there is any qualified dongle connected to a host.

The first determination module 40 includes a first determination unit 401, a first obtaining unit 402, a second determination unit 403, a second obtaining unit 404 and a third determination unit 405.

The first determination unit 401 is configured to determine whether there is any dongle connected to the host.

The first obtaining unit 402 is configured to obtain a first identifier and a second identifier from the dongle.

The second determination unit 403 is configured to determine whether the first identifier and the second identifier are respectively identical to a first identifier prestored in the identification device and a second identifier prestored in the identification device.

The second obtaining unit 404 is configured to obtain a user identity from the dongle.

The third determination unit 405 is configured to determine whether the user identity is identical to a user identity prestored in the identification device.

The storage module 41 is configured to store a detection list generated by the identification device; where data volume of the detection list is larger than a storage capacity of the dongle.

The obtaining module 42 is configured to obtain preset data from the detection list and obtain first input data and first output data based on the preset data.

The sending module 43 is configured to send the first input data to the dongle.

The receiving module 44 is configured to receive fifth output data computed based on the first input data by the dongle.

The second determination module 45 is configured to determine whether the fifth output data is identical to the first output data.

The output module 46 is configured to output information that dongle is wrong, information that no dongle is connected to the host, information that the dongle is legitimate or information that the dongle is pirated.

The identification device further includes a verification module 47, a decryption module 48 and a computation module 49.

The verification module 47 is configured to verify whether the dongle is legitimate.

The verification module includes a third obtaining unit 471 and a fourth determination unit 472.

The third obtaining unit 471 is configured to obtain a user password from the dongle.

The fourth determination unit 472 is configured to determine whether the user password is identical to a user password stored in the identification device.

The decryption module 48 is configured to decrypt the preset data to obtain the first input data and the first output data or to obtain the first input data and the second output data.

The computation module 49 is configured to compute the fifth output data based on a conversion algorithm to obtain sixth output data.

The second determination module 45 is further configured to determine whether the sixth data is identical to the second output data.

The second determination module 45 includes a first comparison unit 451, a first computation unit 452 and a second comparison unit 453.

The first comparison unit 451 is configured to determine whether the fifth output data is identical to the first output data, or determine whether the sixth output data is identical to the second output data.

The first computation unit 452 is configured to compute a current count of detection.

The second comparison unit 453 is configured to determine whether the current count of detection reaches to a preset count.

The output module 46 includes a second computation unit 461 and a first output unit 462.

The second computation unit 461 is configured to restore the current count of detection to an initial value.

The first output unit 462 is configured to output the information that the dongle is wrong, the information that no dongle is connected to the host, the information that the dongle is legitimate or the information that the dongle is pirated.

The first comparison unit 451 is further configured to determine whether all pieces of received fifth output data are respectively identical to corresponding pieces of first output data, or determine whether all pieces of received sixth data are respectively identical to corresponding pieces of second output data.

The described embodiments are only preferred embodiments of the invention and the embodiments are not intended to limit the invention. Any alteration or change easily obtained by those skilled in the art based on the invention should fall in the scope of protection of the invention. Therefore, the invention intends to protect what is claimed in claims.

The invention claimed is:

1. A method for identifying a pirated dongle, comprising:
step S1, determining, by an identification device, whether there is any dongle connected to a host, proceeding to step S2 if there is a dongle connected to the host;
the step S2, obtaining, by the identification device, preset data from a detection list based on a preset rule, wherein the detection list is generated by an encryption device, the detection list is prestored in the identification device, and data volume of the detection list is larger than a storage capacity of the dongle;
step S3, obtaining, by the identification device, first input data and first output data based on the preset data, wherein, the first output data is obtained by the encryption device performing computation on the first input data based on a same algorithm as a legitimate dongle;
step S4, sending, by the identification device, the first input data to the dongle;
step S5, receiving, by the identification device, fifth output data sent by the dongle; and
step S6, determining, by the identification device, whether the fifth output data is identical to the first output data, outputting information that the dongle is legitimate if the fifth output data is identical to the first output data, or outputting information that the dongle is pirated if the fifth output data is not identical to the first output data.

2. The method according to claim 1, wherein the step S6 comprises:
step S6-1, determining, by the identification device, whether the fifth output data is identical to the first output data, proceeding to step S6-2 if the fifth output data is identical to the first output data, or proceeding to step S6-3 if the fifth output data is not identical to the first output data;
the step S6-2, computing, by the identification device, a current count of detection and determining, by the identification device, whether the current count of detection reaches a preset count, proceeding to step S6-4 if the current count of detection reaches the preset count, or proceeding to the step S2 if the current count of detection does not reach the preset count;
the step S6-3, returning, by the identification device, information that the identification device is pirated and ending the procedure; and
the step S6-4, restoring the current count of detection to an initial value and returning information that the dongle is legitimate, by the identification device.

3. The method according to claim 2, wherein in the case that the identification device receives a plurality of pieces of fifth output data in the step S5, the step S6 comprises:
step S6-1', computing, by the identification device, the current count of detection and determining, by the identification device, whether the current count of detection reaches the preset count, proceeding to step S6-2' if the current count of detection reaches the preset count, or proceeding the step S2 if the current count of detection does not reach the preset count; and
the step S6-2', determining, by the identification device, whether all pieces of received fifth output data are respectively identical to corresponding pieces of first output data, proceeding to the step S6-4 if all the pieces of received fifth output data are respectively identical to the corresponding pieces of first output data, or proceeding to the step S6-3 if at least one piece of fifth output data is not identical to the corresponding piece of first output data.

4. The method according to claim 1, wherein the step S3 comprises:
step S3', decrypting, by the identification device, the preset data to obtain the first input data and the first output data.

5. The method according to claim 1, wherein
the step S3 is replaced by:
step S3", obtaining, by the identification device, the first input data and second output data based on the preset data; and
the step S6 is replaced by:
Step S6", performing computation on the fifth output data by the identification device based on a preset conversion algorithm to obtain sixth output data, determining, by the identification device, whether the sixth output data is identical to the second output data, outputting information that the dongle is legitimate if the sixth output data is identical to the second output data, or outputting information that the dongle is pirated if the sixth output data is not identical to the second output data.

6. The method according to claim 5, wherein the step S6" comprises:
step S6"-1, performing computation on the fifth output data by the identification device based on the preset conversion algorithm to obtain the sixth output data, determining whether the sixth output data is identical to the second output data by the identification device, proceeding to step S6"-2 if the sixth output data is identical to the second output data, or proceeding to step S6"-3 if the sixth output data is not identical to the second output data;
the step S6"-2, computing a current count of detection by the identification device and determining, by the identification device, whether the current count of detection reaches a preset count, proceeding to step S6"-4 if the current count of detection reaches the preset count, or proceeding to the step S2 if the current count of detection does not reach a preset count;
the step S6"-3, returning, by the identification device, information that the dongle is pirated; and
the step S6"-4, restoring, by the identification device, the current count of detection to an initial value and returning, by the identification device, information that the dongle is legitimate.

7. The method according to claim 6, wherein in the case that the identification device receives a plurality of pieces of fifth output data in the step S3, the Step S6" comprises:
step S6"-1', computing, by the identification device, the current count of detection and determining, by the identification device, whether the current count of detection reaches the preset count, proceeding to step S6"-2' if the current count of detection reaches the preset count, or proceeding to the step S2 if the current count of detection does not reach the preset count; and step S6"-2', determining, by the identification device, whether all pieces of received sixth output data are respectively identical to corresponding pieces of second output data, proceeding to the step S6"-4 if all the pieces of received sixth output data are respectively identical to the corresponding pieces of second output data, or proceeding to the step S6"-3 if at least one piece of sixth output data is not identical to the corresponding piece of second output data.

8. The method according to claim 5, wherein the step S3" comprises:
step S3''', decrypting the preset data by the identification device to obtain the first input data and the second output data.

9. The method according to claim 1, wherein the step S1 comprises:
step S11, after the identification device receives a command of dongle invoking, determining, by the identification device, whether there is any dongle connected to the host, proceeding to step S12 if there is a dongle connected to the host;
the step S12, obtaining a first identifier and a second identifier from the dongle by the identification device;
step S13, determining, by the identification device, whether the first identifier and the second identifier are respectively identical to a first identifier prestored in the identification device and a second identifier prestored in the identification device; proceeding to step S14 if the first identifier and the second identifier are respectively identical to the first identifier prestored in the identification device and the second identifier prestored in the identification device, or outputting, by the identification device, information that the dongle is wrong if the first identifier and the second identifier are not respectively identical to the first identifier prestored in the identification device and the second identifier prestored in the identification device;
the step S14, reading a user identity from the dongle by the identification device; and
step S15, determining, by the identification device, whether the user identity is identical to a user identity prestored in the identification device, proceeding to the step S2 if the user identity is identical to the user identity prestored in the identification device, or outputting information that the dongle is wrong by the identification device if the user identity is not identical to the user identity prestored in the identification device.

10. The method according to claim 1, wherein data in the detection list is generated by performing computation on the first input data by the encryption device based on an algorithm corresponding to a legitimate dongle to obtain the first output data, and performing computation on the first output data by the encryption device based on a preset conversion algorithm to obtain second output data.

11. The method according to claim 1, wherein after the step S1 and before the step S4, the method further comprises: determining whether the dongle is legitimate by the identification device; continuing the procedure if the dongle is legitimate.

12. The method according to claim 11, wherein determining whether the dongle is legitimate by the identification device comprises: obtaining a user password from the dongle by the identification device; determining, by the identification device, whether the user password is identical to a user password stored in the identification device; determining that the dongle is legitimate if the user password is identical to the user password stored in the identification device or determining that the dongle is not legitimate if the user password is not identical to the user password stored in the identification device.

13. The method according to claim 10, wherein the algorithm corresponding to the legitimate dongle comprises a cryptographic algorithm and an algorithm with which unique output data may be obtained.

14. A device, comprising: a processor, and a storage; wherein the storage is configured to store a detection list generated by an encryption device and codes, wherein data volume of the detection list is larger than a storage capacity of the dongle;
wherein, the processor is configured to execute the codes stored in the storage to:
determine whether there is any qualified dongle connected to a host;
obtain preset data from the detection list and obtain first input data and first output data based on the preset data, wherein the first output data is obtained by the encryption device performing computation on the first input data based on a same algorithm as a legitimate dongle;
send the first input data to the dongle;
receive fifth output data sent by the dongle; wherein the dongle performs computation on the first input data to obtain the fifth output data;
determine whether the fifth output data is identical to the first output data; and
output information that the dongle is wrong, information that no dongle is connected to the host, information that the dongle is legitimate and information that the dongle is pirated.

15. The device according to claim 14, wherein the processor is further configured to:
determine whether there is any dongle connected to the host;
obtain a first identifier and a second identifier from the dongle;
determine whether the first identifier and the second identifier are respectively identical to a first identifier prestored in the device for identifying the pirated dongle and a second identifier prestored in the device for identifying the pirated dongle;
obtain a user identity from the dongle; and
determine whether the user identity is identical to a user identity prestored in the device for identifying the pirated dongle.

16. The device according to claim 14, wherein the processor is further configured to:
verify whether the dongle is legitimate;
decrypt the preset data to obtain the first input data and the first output data, or decrypt the preset data to obtain the first input data and second output data; and
perform computation on the fifth output data based on a preset algorithm to obtain sixth output data;
wherein the processor is further configured to determine whether the sixth output data is identical to the second output data.

17. The device according to claim 16, wherein the processor is further configured to:
obtain a user password from the dongle; and
determine whether the user password is identical to a user password stored in the device for identifying the pirated dongle.

18. The device according to claim 16, wherein the processor is further configured to:
- determine whether the fifth output data is identical to the first output data, or determine whether the sixth output data is identical to the second output data;
- compute a current count of detection; and
- determine whether the current count of detection reaches a preset count.

19. The device according to claim 18, wherein the processor is further configured to:
- restore the current count of detection to an initial value; and
- output the information that the dongle is wrong, the information that no dongle is connected to the host, the information that the dongle is legitimate or the information that the dongle is pirated.

* * * * *